United States Patent [19]

Podola et al.

[11] 4,415,793
[45] Nov. 15, 1983

[54] WELDER FOR CONTINUOUS RESISTANCE FLASH-BUTT WELDING

[75] Inventors: Nikolai V. Podola; Sergei I. Kuchuk-Yatsenko; Vadim P. Krivonos; Boris L. Grabchev, all of Kiev, U.S.S.R.

[73] Assignee: AN USSR Institut Elektrosvarki imeni E.O. Patona, Kiev, U.S.S.R.

[21] Appl. No.: 297,879

[22] Filed: Aug. 31, 1981

[51] Int. Cl.³ .............................................. B23K 11/04
[52] U.S. Cl. ..................................... 219/110; 219/97; 219/101
[58] Field of Search ................ 219/97, 100, 101, 104, 219/108, 110

[56] References Cited

U.S. PATENT DOCUMENTS 2,727,969 12/1955 Platte .................................. 219/100
4,329,560 5/1982 Tanuma .............................. 219/100

Primary Examiner—C. C. Shaw
Attorney, Agent, or Firm—Murray Schaffer

[57] ABSTRACT

The primary winding of a welding transformer is provided with controlled rectifiers and the primary winding of a current transformer. The secondary winding of the current transformer is connected to a welding current pick-up. The phase angle of opening of the controlled rectifiers is varied through a phase shifter and a programmer. A pulse shaper is provided for shaping pulses synchronized with the voltage of a supply circuit and has an output connected to a phase delay unit. An OR circuit is provided having inputs connected to the output of the welding current pick-up and to one output of the programmer, and an output connected together with the output of the phase delay unit through AND logical circuits and an inverter to the inputs of a voltage switching flip-flop having outputs each being connected in pair with another output of the programmer through additional AND circuits to corresponding inputs of the phase shifter. The programmer incorportes a welding current pulsation frequency pick-up having an input connected to the secondary winding of the current transformer, a program halt unit, a welding time counter, a decoder, a "weld-on" flip-flop, an output flip-flop unit, and logical circuits to provide interaction between the control signals within the programmer.

1 Claim, 1 Drawing Figure

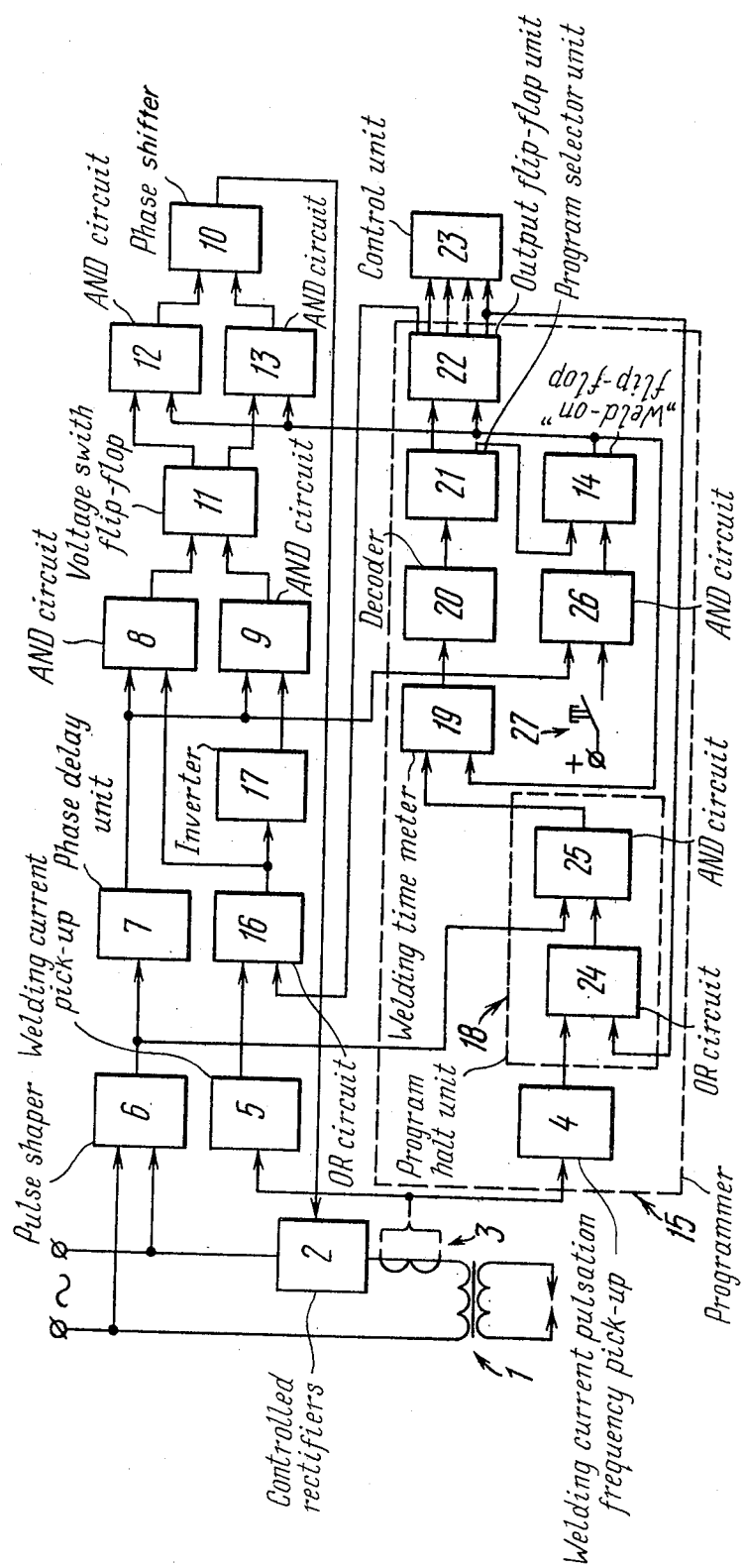

WELDER FOR CONTINUOUS RESISTANCE FLASH-BUTT WELDING

BACKGROUND OF THE INVENTION

1. Field of the Invention

The present invention relates to the art of material working and welding, and particularly is concerned with a welder for continuous resistance flash-butt welding.

The invention may be used for welding work pieces large cross-section, for instance, rails, large diameter pipes, bars, etc.

2. The Prior Art

It is common knowledge that resistance flash-butt welders consume a great amount of electric energy when in use. Since these welders are operated at installations together with other electric energy consumers, there inevitably occurs a mutual interference therebetween in their supply circuit. Thus, for instance, a known resistance flash-butt welder (cf. USSR Author's Certificate No. 203,109, and U.S. Pat. No. 2,727,969) is provided with controlled rectifiers placed in the primary winding circuit of a welding transformer. The angle of opening of the controlled rectifiers and correspondingly the effective voltage across the transformer are varied during welding operation with the aid of a phase shifter according to a preset program.

Varying the angle of opening of the controlled rectifiers is associated with lengthy transition processes which are accompanied by current surges affecting the operation of the controlled rectifiers and also, which is no less important, the operation of the other electric energy consumers placed in parallel with said welder.

A typical apparatus of the above group of welders is a resistance flash-butt welder for a continuous flash-butt welding (cf. USSR Author's Certificate No. 165,260) having a voltage regulator. This welder comprises a welding transformer having controlled rectifiers and a current transformer placed in its primary winding circuit, a welding current level pick-up placed in the secondary winding circuit of the current transformer, and a phase shifter with a positive feed-back, and a programmer.

During flashing operation command signals are applied from the programmer to the phase shifter which in response to and in accordance with these signals varies the angle of opening of the controlled rectifiers as a result of which the voltage across the welding transformer is stepped down. Because of a random character of formation of molten metal bridges (that is contact point of fusion) between parts being weld-joined and for some other reasons there occur short-circuiting in the welding circuit, in which case the welding current exceeds its predetermined magnitude, and the phase shifter having a current feed-back varies the angle of opening of the controlled rectifiers to increase the voltage across the welding transformer.

The increase of the electric power at the contact points of fusion thus formed results in disruption thereof; the welding current lowers and the voltage across the welding transformer decreases to attain its predetermined value and to thereby restore conditions for continuous flashing.

It is to be noted, however, that the above welder presents an active inductive load having a variable load factor normally varying in the range of from 0.9 (in the melting mode) up to 0.4 (while short-circuiting). Stepping up the voltage with the increase of the welding current occurs at random moment in a half-period of supply voltage. When the angle of opening of the controlled rectifiers does not correspond to an actual value of the power factor, a transition processes take place in the welding circuit, as a result of which the welding current may considerably exceed the magnitude of a short-circuiting current. The current surges, apart from affecting the operation of the controlled rectifiers and the power supply source, may also cause a false reverse in the actuating means of a movable part being welded.

As a matter of fact, in welders with a programmed stepping-down of voltage across a welding transformer the feed speed of the movable part being welded is controlled with the use of a current feedback when the conductivity of the contact points of fusion increases. The above-mentioned current surges are received as an increased conductivity of the contact points of fusion caused by the increase of contact area, which leads to an unnecessary reverse of the driving means and interruption of the flashing operation as a result.

It should also be noted that the above welder has an inadequate accuracy in following the welding voltage variation program. This disadvantage is manifested to the greatest extent in welders wherein use is made of master controllers for the programmer. Such master controllers halt the program only in the event of reversal. The duration of the shortcircuiting and the time spent for approaching abutting edges of the parts being weld-joined, until they contact each other after the reverse, are not taken into account by the master controller which after the reverse immediately starts following the program again. Since the start of flashing in the case of large compact cross-sections is accompanied by inevitable short-circuiting in the welding circuit between the abutting edges of the workpieces being weld-joined and the speed of relative motion of said workpieces is comparatively low (from 0.2 to 0.25 mm/s) the correction of the voltage under working conditions will take place at moments which will not correspond to the preset program.

SUMMARY OF THE INVENTION

The principle object of the invention is to provide a welder for continuous resistance flash-butt welding, wherein due to taking account of effective voltages in the primary winding circuit of the welding transformer and selecting on the basis thereof the proper current in the welding circuit the transition processes in the welding circuit are eliminated and the stability of the welded joint quality is enhanced as a result.

Another object of the invention is to improve the efficiency of the welder operation.

These and other objects of the invention are attained in that a welder for continuous resistance flash-butt welding, comprising a welding transformer. The primary circuit of the transformer is provided with controlled rectifiers and the primary winding of a current transformer. A welding current pick-up is connected to the secondary winding of the current transformer, and a phase shifter is electrically connected to the controlled rectifiers to correct the angle of opening thereof via a programmer which monitors the operation of the welder. The welder according to the invention further includes a pulse shaper adapted to form pulses synchronized with the voltage of a supply circuit. The output of the pulse shaper is connected to a phase delay unit to delay in phase pulses, an OR circuit having its inputs connected to the output of the welding current pick-up and to one output of the programmer, and its output connected together with the output of the phase delay unit through an AND circuit to one input of a voltage switching flip-flop and also connected through an inverter together with said output of the phase delay unit through the other AND circuit to the other input of the voltage switching flip-flop having its both outputs each in pair with the other output of the programmer connected through additional AND circuits to corresponding inputs of the phase shifter and control unit for operating actuating means of the welder. The programmer including a welding current pulsation frequency pick-up having an input connected to the secondary winding of the current transformer, a program halt unit incorporating an OR circuit and an AND circuit having its one input connected to the output of said OR circuit, a series circuit including a welding time counter and a decoder, a program selector unit having an input connected to the output of the decoder, and AND circuit, a "weld-on" flip-flop and an output flip-flop unit. The OR circuit of the program halt unit has one input connected to the output of the welding current pulsation frequency pick-up, the second input of the AND circuit electrically connected with the output of the pulse shaper and the output of this AND circuit being connected to an information input of the welding time counter. The welding time counter has a control input connected to the output of a "weld-on" flip-flop, the AND circuit of the programmer has one input connected to the output of the phase delay unit, its other input adapted to receive a "weld-on" signal, and its output connected to one input of the "weld-on" flip-flop which in time has its other input connected to one of the outputs of the program selector unit. The output of the "weld-on" flip-flop is also connected to the other input of the output flip-flop unit and to the other inputs of the additional AND circuits, the output flip-flop unit having one of its outputs connected to the other input of the OR circuit of the program halt unit, another output connected to the other input of the OR circuit and its remainder outputs connected to the inputs of the control unit for operating the actuating means of the welder.

Such construction of the proposed welder for continuous resistance flash-butt welding makes it possible to use welding parameters which are close to the maximum ones with respect to the stability of the flashing process. This is achieved due to the correction of the welding voltage. In this case the thermal efficiency attains its highest level so that the required temperature of the parts being welded is reached in the shortest time. When welding with the maximum melting stability the influence of the disturbance factors on the heating of the parts being welded allowing more stable heating of the parts and hence a more stabilized quality of the weld joints produced.

BRIEF DESCRIPTION OF THE DRAWING

The invention will now be explained in detail with reference to the embodiment thereof which is represented in the accompanying drawing, wherein a block diagram of the welder of the invention is shown.

DETAILED DESCRIPTION OF THE INVENTION

A resistance flash-butt welder comprises a welding transformer 1, in the primary winding circuit of which are placed controlled rectifiers 2 (commonly thyristors) to control the voltage across the secondary winding of the welding transformer, and a current transformer 3 to measure a current flowing in the primary winding circuit of the welding transformer.

The output winding of the current transformer 3 is connected to a welding current pulsation frequency pick-up 4, such as that shown in *Automatic Welding* No. 5, 1968 page 71 "A Control Device for Controlling the Continuous Resistance Flash-Butt Welding Process", V. P. Krivonos and to a welding current pick-up 5 for generating command signals in response to which the rate of flashing and the welding voltage are changed when the current exceeds its predetermined magnitudes. To the primary winding of the welding transformer there is connected a signal shaper 6 which converts a sinusoidal voltage to a train of short pulses being formed at the points where a sinusoid crosses the zero line.

The pulse shaper 6 has its output connected to the input of the phase delay unit 7 for shifting the input pulses 88–90 electrical degrees (phase angle) with respect to the voltage phase of the supply circuit.

The synchronized pulse phase delay unit 7 has an output connected to the combined inputs of first and second AND circuits 8, 9 whose outputs are connected to a phase shifter 10 to step down or up the voltage across the welding transformer 1. The output of the AND circuit 8 and 9 pass through voltage switching flip-flop 11 and additional AND circuits 12, 13 which have their combined inputs connected to the output of the "weld-on" flip-flop 14.

The output of the welding current pick-up 5 and one of the outputs of the programmer 15 are connected through an OR circuit 16 to the second input of the AND circuit 8 and to the second input of the AND circuit 9 through the inverter 17.

The programmer 15 which is adapted to set a program of alteration in the welding parameters, comprises a series circuit including a program halt unit 18, a binary pulse counter 19, a decoder 20 to convert the binary code to a decimal one, a program selector unit 21 such as a relay switch unit adapted to select a required program of alteration of welding parameters in time, and an output flip-flop unit 22 for transmitting command signals to a control unit 23, in response to which signals the latter operates actuating means in accordance with the preset program.

The program halt unit 18 includes an OR circuit 24 and an AND circuit 25.

The OR circuit 24 has one input connected to the output of the welding current pulsation frequency pick-up 4, and the other input connected to the output of the "weld-on" flip-flop of the output flip-flop unit 22.

The output flip-flop 22 unit is made in the form of a plurality of flip-flops adapted to transmit command signals to actuating means, and is electrically connected to the control unit 23 for operating the actuating means of the welder.

The counter 19, the decoder 20, and the program selector unit 21 have a feedback through the "weld-on" flip-flop 14 so as to form a signal for automatically resetting the counter 19 after the welding operation is completed.

The "weld-on" flip-flop 14 has its one input connected to the output of the AND circuit 26, and its other input connected to the output of the program selector unit 21.

The AND circuit 26 has one input connected to the push-button "WELD-ON" 27, and its other input connected to the output of the synchronized pulse phase delay unit 7.

The proposed welder operates as follows. When the welder is in a ready-for-operation position there appears at the output of the welding current pick-up 5 and of the welding current pulsation frequency pick-up 4, a signal of a logical "0", since there is no measurable current through the transformer 3. A similar signal also appears at the output of the "weld-on" flip-flop 14, as a result of which the counter 19 is in a zero position. At the combined inputs of the additional coincidence circuits 12, 13 logical "0" signal inhibits switching-on of the controlled rectifiers 2. From the voltage switch flip-flop of the unit 22 there is transmitted a logical "1" signal through the OR circuit 16 to the input of the first AND circuit 8. At the moment of arrival of the successive pulse from the phase delay unit 7 the logical "1" at the output of the circuit 8 causes the flip-flop 11 to be set in a position in which to the input of the coincidence circuit 12 is applied a logical "1" to prepare switching-on of the phase shifter 10 to a high voltage.

When the push-button "WELD-ON" is pressed the flip-flop 14 is prepared to change to a state of logical "1" at its output terminal at the moment when a pulse from the delay unit 7 is applied to the input of the AND circuit 26. In this case a logical "1" signal at the output of the circuit 12 causes the controlled rectifiers through the phase shifter 10 to be opened to a high voltage. Simultaneously the signal "1" from the output terminal of the flip-flop 14 is applied through the unit 22 to the input of the control unit for operating the actuating means of the welder, whereby energizing the driving motor for moving the workpieces being welded to each other, which signal is also applied to the input of the counter 19, thereby preparing the latter for reading input pulses applied from the unit 18.

When welding current pulsation occurs a signal "1" at the output of the pick-up is provided enabling the pulses passing through the OR circuit 24 from the frequency divider to pass through the AND circuit 25 to the input of the counter 19, in which case there takes place reading in time of a preset program.

In the case of short-circuiting in the welding circuit or break therein, a signal "0" at the output of the pick-up 4 inhibits the passage of the pulses through the circuit 24 to cease the reading of the program.

In response to a signal of stepping down the welding voltage from the corresponding output of the flip-flop unit 22 a signal "0" is applied to the input of the circuit 16, and of the circuit 8, while to the input of the circuit 9 through the inverter 17 there is applied a logical "1" signal. At the moment when a pulse is applied from the delay unit 7 a signal "1" is applied at the output of the circuit 9 which causes the flip-flop 11 to change state and operate via the circuit 13 the phase shifter 10 thereby change the angle of opening of the controlled rectifiers 2.

If during the melting period, the welding current exceeds its preset level there will appear at the output of the pick-up 5, a signal "1" to cause the signal "1" at the corresponding input of the circuit 8. Thereafter, at the input of the circuit 9 there appears a logical "0" signal. When this is applied from the delay unit 7, a signal to the other input of the circuit 8 the flip-flop 11 is caused to change its state to step up voltage across the welding transformer 1. With the increase in the electric power at the melting contact the speed of heating of the molten metal bridges increases, leading to the disruption thereof, as a result of which the welding current decreases. From the output of the pick-up 5 is applied a signal "0" and the voltage across the welding transformer is stepped down.

Thus switching the welding transformer into a circuit, correcting the voltage by commands from the programmer and on signals from the welding current level pick-up take place in the range of from 88 to 90 electrical degrees of the first half-period of the supply voltage, whereafter the predetermined angle of opening of the controlled rectifiers is set automatically.

After the preset melting time has elapsed a command signal is applied from the unit 22 to the unit 25 to start upsetting operation.

During the upsetting the HF pulsations do not occur (at the output of the pick-up 4 is a signal "0"). To meter the upsetting time with the welding current flowing, the signal "1" from the output of an "upsetting-on" flip-flop of the unit 22 through the OR circuit 23 enables the passage of the pulses from the frequency divider to the input of the counter 21. When the preset upsetting time has elapsed the signal from the output of the unit 21 causes the flip-flop 14 to change its state. A signal at its output terminal causes the welding transformer to be cut off from the circuit and the counter 19 to be set in a zero position, in which case the whole system is set in its ready-for-operation position.

This invention may be varied and otherwise embodied all within the scope of the appended claims.

We claim:

1. A resistance flash-butt welder for continuous flash-butt welding, comprising:
   a welding transformer having a primary winding circuit and a secondary winding circuit;
   controlled rectifiers placed in the primary winding circuit of said welding transformer for controlling the voltage in the secondary winding circuit thereof, and thereby determining the upsetting time of the welding with the voltage being applied;
   a current transformer having a primary winding placed in the primary winding circuit of said welding transformer, and a secondary winding;
   a welding current pick-up having an input connected to the secondary winding of said current transformer;
   a phase shifter having two inputs and an output, said output being electrically connected to said controlled rectifiers for controlling the phase angle opening of said controlled rectifiers;
   a pulse shaper having an input connected to the primary winding of said welding transformer for generating pulses synchronized with the supply circuit voltage;
   a phase delay unit having an input connected to the output of said pulse shaper for delaying pulses in time formed by said pulse shaper;
   a first OR circuit having a first and a second input and an output, the first being connected to the output of said welding current pick-up;

a flip-flop for switching the voltage in the supply circuit at moments when the welding current exceeds its predetermined magnitude, said flip-flop having a first and a second input and a first and a second output;

an inverter having an input connected to the output of said OR circuit;

a first, a second, a third, and a fourth AND circuits each having a first and a second input and an output, the first inputs of said first and said second AND circuits being jointly connected to the output of said phase delay unit, the second input of said first AND circuit being connected to the output of said OR circuit, the second input of said second AND circuit being connected to the output of said inverter, the outputs of said first and second AND circuits being connected to a first and second input of said flip-flop respectively, the first inputs of said third and fourth AND circuits being connected to the first and the second outputs of said flip-flop, the second inputs of said third and fourth AND circuits being combined, the outputs of said third and fourth AND circuits being connected to the inputs of said phase shifter;

a welder control unit;

a programmer including a welding current pulsation frequency pick-up having an input connected to the secondary winding of said current transformer;
a program halt unit comprising a second OR circuit, having a first and a second input, and an output, the first input of said second OR circuit being connected to the output of said welding current pulsation frequency pick-up, and a fifth AND circuit having a first and a second input and an output, said first input being connected to the output of said second OR circuit, and the second input being connected to the output of said pulse shaper;

a pulse counter having an information input connected to the output of said fifth AND circuit and an output;

a decoder having an input connected to the output of said pulse counter, and an output;

a program selector unit having an input connected to the output of said decoder, and first and a second output;

a sixth AND circuit having a first input connected to the combined first inputs of said first and second AND circuits, a second input adapted to receive "weld-on" signals, and an output;

a "weld-on" flip-flop having a first input connected to the first output of said program selector unit, a second input connected to the output of said sixth AND circuit, and an output connected to a control input of said pulse counter and to the second input of said third and fourth AND circuits, and an output flip-flop unit having a first input connected to the second output of said program selector unit, a second input connected to the output of said "weld-on" flip-flop, and a plurality of outputs, one of said plurality of outputs being connected to the second input of said second OR circuit; another output connected to the second input of the first OR circuit.

* * * * *